Jan. 3, 1933.  F. CREMER  1,893,465
PROCESS AND APPARATUS FOR MAKING RUBBER OR LIKE STRIP OR THREAD MATERIAL
Filed May 4, 1932
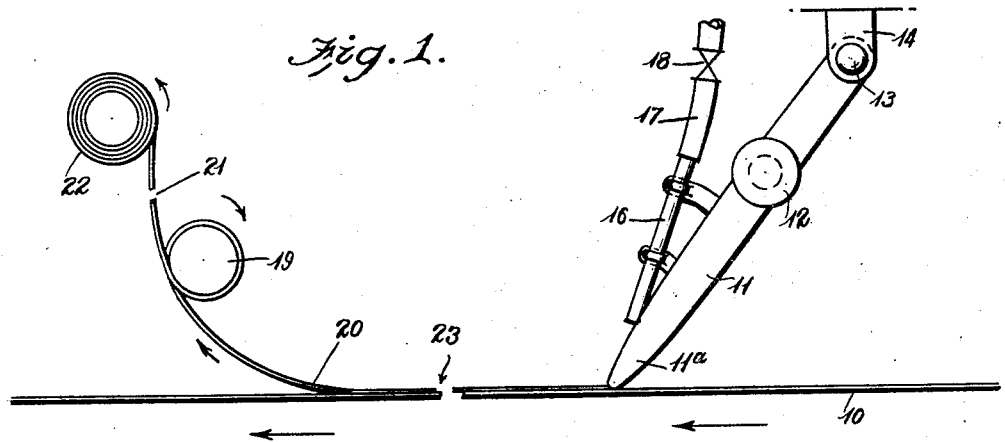
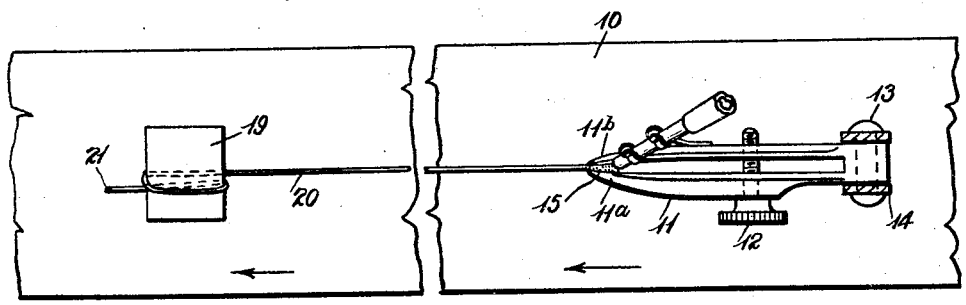
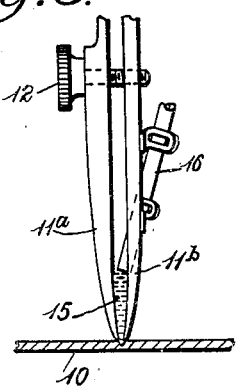
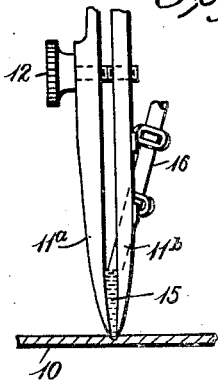
Inventor
*Frits Cremer*
By *Ely and Barrow*
Attorneys Patented Jan. 3, 1933

1,893,465

UNITED STATES PATENT OFFICE

FRITS CREMER, OF ENGLEWOOD, NEW JERSEY, ASSIGNOR TO XETAL CORPORATION, OF NEW YORK, N. Y., A CORPORATION OF DELAWARE

PROCESS AND APPARATUS FOR MAKING RUBBER OR LIKE STRIP OR THREAD MATERIAL

Application filed May 4, 1932. Serial No. 609,250.

This invention relates to procedure and apparatus for making thread or strip material of rubber or the like and particularly of rubber in fluid form, such as the natural or artificial latices.

The general purpose of the invention is to provide procedure and apparatus for making very fine strips or threads of rubber which may be wound, knitted, sewed or woven into various articles or fabrics, either with or without cotton, silk, woolen or other textiles, the rubber thread being covered or uncovered with threads of other materials as required for different uses.

More particularly the invention has for its object the provision of a method and apparatus whereby a pen containing the liquid rubber is applied upon a suitable surface and the rubber is drawn from the pen upon said surface by relative movement of the pen and said surface to form quickly and cheaply a fine, strong, smooth, continuous and uniform thread upon said surface.

A further object of the invention is to provide a method and apparatus whereby said thread is effectively dried or set and, if desired, partially vulcanized on said surface.

A further object of the invention is to provide a method and apparatus whereby the thread may be effectively removed from said surface either for further treatment such as further drying or vulcanization, or for use.

The foregoing and other objects of the invention are attained by the method and apparatus illustrated in the accompanying drawing and described below. It is to be understood that the invention is not limited to the specific form thereof described and illustrated.

Of the accompanying drawing:

Figure 1 is a side elevation partly broken away, diagrammatically illustrating the improved procedure and apparatus;

Figure 2 is a plan view thereof;

Figure 3 is an end elevation of a pen shown applied to grooved surface to apply a strip of rubber into said groove, the groove being shown of V-shape in transverse section;

Figure 4 is a similar view, the groove in Figure 4 being shown of rounded shape in section.

Referring to the drawing, the numeral 10 designates means providing a surface such as a web, disc, etc. of metal or paper (preferably glazed) or other suitable material which may be caused to be moved relatively in the direction of the arrows respecting a pen 11 which as illustrated is a drawing pen with adjustable blades 11a, 11b. Any suitable pen may be used, but a drawing pen of the type shown is preferred since any desired width of the strip or thread of rubber formed by said pen on said surface may be readily obtained. The pen 11 may be adjusted as to width by the usual screw 12.

The pen 11 may be suitably supported so as to rest upon the surface 10 in the manner shown as by pivoting the pen at 13 on suitable supporting brackets 14 and the rubber or like solution 15 may be continuously supplied to the pen by a supply tube 16 attached onto the pen as shown, if desired, and having an outlet between the blades thereof, the tube 16 being connected by a duct 17 in which is a suitable control valve 18, the duct 17 being extended to a suitable source of supply (not shown).

The rubber solution or liquid rubber used may be vulcanizable or pre-vulcanized latex and, as will be apparent, will be drawn from the pen by the relative movement of the surface 10 with respect to the end of the pen, the speed of this movement being so controlled as to produce thread of determinate thickness and of fine uniform quality. The rubber used may be so compounded as to provide thread of various qualities for different purposes, the usual vulcanizing, accelerating, anti-aging and other ingredients being used as are used in the production of other rubber articles.

As shown in Figures 3 and 4, the liquid rubber may be applied in the manner set forth above to plain smooth surfaces or to grooves of any desired shape in suitable surfaces to form thread of different shapes in cross-section.

During and after application of the thread to the surface 10, said thread may be suitably heated, treated with chemicals, etc. to dry or cure the same, this being accomplished in suitable apparatus through which the thread may be conducted located at point 23. This drying or curing may be either partly or completely performed while said thread is on said surface.

Rubber threads or strips may be directly applied onto webs of material passed in association with a pen as illustrated, or they may be applied to the surface of material 10 and removed for further treatment or for use.

To remove the thread from said surface 10 it may be trained over a driven roller 19 or other suitable means and this means may be, and preferably is, driven at such a rate compared to the speed at which the thread is applied to surface 10 as will apply tension in the thread at the point 20 to facilitate its removal from the surface 10.

The thread may then be extended from the removing means 19, through further treating, drying or curing equipment located at the point 21, if desired or required, to a reel 22 or to other winding apparatus, or knitting, sewing, weaving or covering machines. The thread may be covered by a winding of cotton, silk, wool or artificial silk thread about the same as will be understood by skilled textile artisans.

As will be apparent, a plurality of pens may be applied as illustrated and described in the foregoing paragraphs to a single relatively moving means such as means 10, providing a suitable surface to receive the rubber and to obtain threads of various thicknesses. The rubber may be applied in superposed layers to said surface by repeatedly passing the surface 10 relatively to the pen 11, or by arranging a series of pens in alignment respecting said surface, the respective rubber layers being preferably dried or partly cured or otherwise treated to set the same between each application of liquid thereon.

It will be apparent that the invention is not limited to the specific form thereof shown. Different types of pens may be used, either adjustable or non-adjustable, and the rubber thread formed may be differently treated for different purposes, as will be understood by skilled rubber artisans. Moreover, the invention may be applied to making strips or threads from other liquid materials. Accordingly numerous modifications and uses of the invention may be resorted to without departing from the spirit thereof and the scope of the appended claims.

What is claimed is:

1. That method for making rubber or like thread or strip material which comprises relatively moving a pen containing fluid rubber or the like and a surface with the pen in contact with said surface whereby a continuous thread of rubber will be drawn from said pen onto said surface, treating said thread to set the same on said surface and withdrawing the thread from said surface under tension.

2. That method for making rubber or like thread or strip material which comprises relatively moving a pen containing fluid rubber or the like and a surface with the pen in contact with said surface whereby a continuous thread of rubber will be drawn from said pen onto said surface, treating said thread to set the same on said surface and withdrawing the thread from said surface.

3. That method for making rubber or like thread or strip material which comprises relatively moving a pen containing fluid rubber or the like and a surface with the pen in contact with said surface whereby a continuous thread of rubber will be drawn from said pen onto said surface, and withdrawing the thread from said surface under tension.

4. That method for making rubber or like thread or strip material which comprises relatively moving a pen containing fluid rubber or the like and a surface with the pen in contact with said surface whereby a continuous thread of rubber will be drawn from said pen onto said surface, and withdrawing the thread from said surface.

5. That method for making rubber or like thread or strip material which comprises relatively moving a pen containing fluid rubber or the like and a surface with the pen in contact with said surface whereby a continuous thread of rubber will be drawn from said pen onto said surface and treating said thread to set the same on said surface.

6. That method for making rubber or like thread or strip material which comprises relatively moving a pen containing fluid rubber or the like and a surface with the pen in contact with said surface whereby a continuous thread of rubber will be drawn from said pen onto said surface.

7. That process for forming strip material from a liquid thread forming material which when set or dry is self-sustaining and of substantial tensile strength comprising relatively drawing a pen containing the material in liquid form over a surface to apply a strip of the material to said surface and withdrawing the strip of material thus formed from said surface.

8. That process for forming strip material from a liquid thread forming material which when set or dry is self-sustaining and of substantial tensile strength comprising relatively drawing a pen containing the liquid over a surface to apply a strip of the material to said surface, supplying the liquid to said pen to maintain a supply of liquid on said pen at all times whereby a continuous thread may be formed and withdrawing the strip of material thus formed from said surface.

9. Apparatus for making strip or thread material from a liquid comprising a pen, means for supplying the material in liquid form to the pen to maintain a supply therein, means providing a surface in contact with the pen, said pen and said surface being relatively movable, and means for removing the thread from said surface.

10. Apparatus for making strip or thread material comprising a pen, means for supplying the material in liquid form to the pen to maintain a supply therein, means providing a surface in contact with the pen, said pen and said surface being relatively movable, and means for removing the thread from said surface under tension.

FRITS CREMER.